US012613721B2

(12) United States Patent
Deng et al.

(10) Patent No.: US 12,613,721 B2
(45) Date of Patent: Apr. 28, 2026

(54) METHOD AND SYSTEM FOR REMOTELY CONTROLLING INTERFACE DISPLAY, DEVICE AND STORAGE MEDIUM

(71) Applicant: SHENZHEN ZOLON TECHNOLOGY CO., LTD., Shenzhen (CN)

(72) Inventors: Saifeng Deng, Shenzhen (CN); Chuanxi Wang, Shenzhen (CN); Rongsheng Hua, Shenzhen (CN)

(73) Assignee: SHENZHEN ZOLON TECHNOLOGY CO., LTD., Shenzhen (CN)

( * ) Notice: Subject to any disclaimer, the term of this patent is extended or adjusted under 35 U.S.C. 154(b) by 199 days.

(21) Appl. No.: 18/290,908

(22) PCT Filed: Jul. 12, 2022

(86) PCT No.: PCT/CN2022/105088
§ 371 (c)(1),
(2) Date: Jan. 22, 2024

(87) PCT Pub. No.: WO2023/001021
PCT Pub. Date: Jan. 26, 2023

(65) Prior Publication Data
US 2024/0345856 A1 Oct. 17, 2024

(30) Foreign Application Priority Data
Jul. 21, 2021 (CN) .......................... 202110824759.1

(51) Int. Cl.
G06F 9/451 (2018.01)
G06F 3/0485 (2022.01)
(52) U.S. Cl.
CPC ............ *G06F 9/452* (2018.02); *G06F 3/0485* (2013.01)

(58) Field of Classification Search
CPC .............................. G06F 3/1454; G06F 21/84
See application file for complete search history.

(56) References Cited

U.S. PATENT DOCUMENTS 9,361,469 B2 * 6/2016 Thiyagarajan ........ G06F 3/1454
9,514,333 B1 * 12/2016 Patel ................... G06Q 30/016
(Continued)

FOREIGN PATENT DOCUMENTS

CN 101470786 A 7/2009
CN 104484612 A 4/2015
(Continued)

OTHER PUBLICATIONS

Chinese Office Action corresponding to CN Application No. 2024012202530190; Mailing Date, Jan. 22, 2024.
(Continued)

*Primary Examiner* — Asher D Kells
(74) *Attorney, Agent, or Firm* — CANTOR COLBURN LLP

(57) ABSTRACT
A method and a system for remotely controlling interface display, a device, and a storage medium. The method includes steps of: detecting a first operation based on a first display window displayed in a first device, where the first display window displays a display interface of a second device, and the first operation is used to indicate an operation of controlling the second device to perform an occlusion on an area to be occluded in the display interface of the second device; determining area information of the area based on the first operation; and sending an occlusion instruction to the second device based on the area information, where the occlusion instruction is used to instruct the second device to perform an occlusion processing on the area based on the area information.

18 Claims, 5 Drawing Sheets

(56) References Cited

U.S. PATENT DOCUMENTS

| | | | |
|---|---|---|---|
| 2005/0091359 A1* | 4/2005 | Soin | G09G 5/006 |
| | | | 709/223 |
| 2007/0260731 A1* | 11/2007 | Pitta | G06F 21/6218 |
| | | | 709/225 |
| 2008/0208579 A1* | 8/2008 | Weiss | G06Q 30/02 |
| | | | 707/E17.014 |
| 2011/0154219 A1* | 6/2011 | Khalatian | G06F 3/1462 |
| | | | 715/751 |
| 2012/0036452 A1* | 2/2012 | Coleman | G06F 21/55 |
| | | | 715/751 |
| 2015/0302621 A1* | 10/2015 | Liu | G06T 11/60 |
| | | | 345/647 |
| 2015/0319178 A1* | 11/2015 | Desai | G06F 9/451 |
| | | | 726/1 |
| 2019/0279344 A1* | 9/2019 | Duggal | G06F 18/2411 |
| 2020/0184080 A1* | 6/2020 | Trim | G06F 21/84 |
| 2020/0226953 A1* | 7/2020 | Anand | G09C 5/00 |
| 2021/0048973 A1* | 2/2021 | Schwabacher | G06F 21/6245 |
| 2021/0397752 A1* | 12/2021 | Li | G06F 3/0482 |
| 2022/0253551 A1* | 8/2022 | Haguel | G06F 21/6245 |
| 2022/0358232 A1* | 11/2022 | Yuan | G06F 21/629 |
| 2025/0028550 A1* | 1/2025 | Cheng | G06F 9/45558 |

FOREIGN PATENT DOCUMENTS

| | | |
|---|---|---|
| CN | 104935624 A | 9/2015 |
| CN | 105681584 A | 6/2016 |
| CN | 106210663 A | 12/2016 |
| CN | 107333118 A | 11/2017 |
| CN | 110611735 A | 12/2019 |
| CN | 112257123 A | 1/2021 |
| CN | 113642053 A | 11/2021 |

OTHER PUBLICATIONS

International Search Report for International Application No. PCT/CN2022/105088; Mailing Date, Sep. 28, 2022.
Written Opinion for International Application No. PCT/CN2022/105088; Mailing Date, Sep. 20, 2022.

* cited by examiner

（A）                    （B）

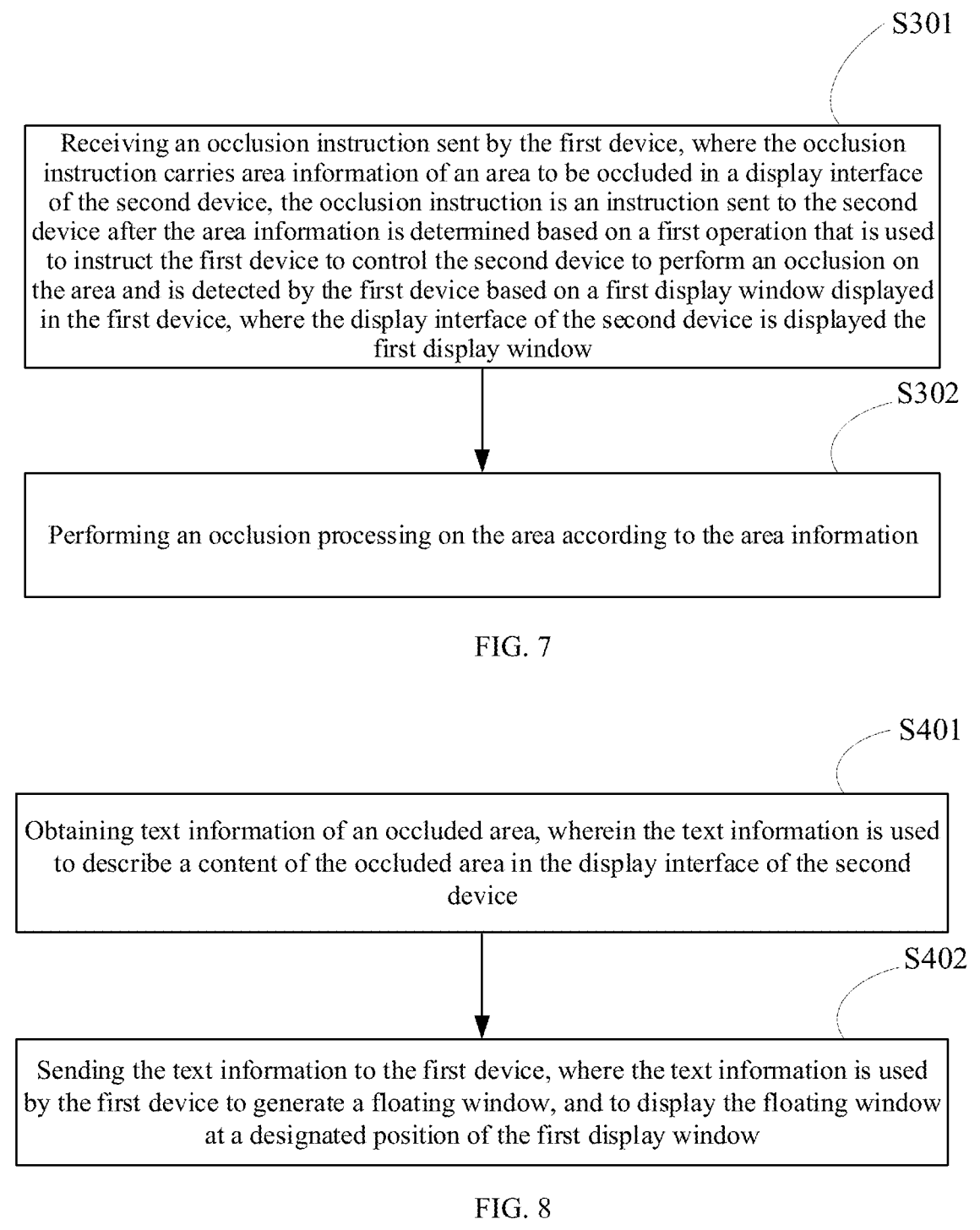

S301

Receiving an occlusion instruction sent by the first device, where the occlusion instruction carries area information of an area to be occluded in a display interface of the second device, the occlusion instruction is an instruction sent to the second device after the area information is determined based on a first operation that is used to instruct the first device to control the second device to perform an occlusion on the area and is detected by the first device based on a first display window displayed in the first device, where the display interface of the second device is displayed the first display window

S302

Performing an occlusion processing on the area according to the area information

Obtaining text information of an occluded area, wherein the text information is used to describe a content of the occluded area in the display interface of the second device

S402

Sending the text information to the first device, where the text information is used by the first device to generate a floating window, and to display the floating window at a designated position of the first display window

FIG. 8

METHOD AND SYSTEM FOR REMOTELY CONTROLLING INTERFACE DISPLAY, DEVICE AND STORAGE MEDIUM

CROSS-REFERENCE TO RELATED APPLICATIONS

This application is the national phase entry of International Application No. PCT/CN2022/105088, filed on Jul. 12, 2022, which is based upon and claims priority to the Chinese Patent Application No. 202110824759.1, filed on Jul. 21, 2021, the entire contents each of which are incorporated herein by reference.

TECHNICAL FIELD

The present application relates to the field of terminal technologies, and in particular, to a method and a system for remotely controlling interface display, a device and a storage medium.

BACKGROUND

Currently, data interaction between a first device and a second device is often required, in order to perform work tasks smoothly. For example, the first device provides remote assistance to the second device to control the second device, obtain control over a display interface of the second device, and perform corresponding assistance activities.

However, currently, when the first device remotely assists the second device, some privacy areas such as account login and password input will be directly displayed on the display interface of the second device and thus may be seen by a user of the second device, thereby resulting in information leakage.

SUMMARY

Embodiments of the present application provide a method and a system for remotely controlling interface display, a device and a storage medium, to solve the problem of information leakage in the privacy area of the display interface of the controlled device.

In accordance with a first aspect, an embodiment of the present application provides a method for remotely controlling interface display, the method is applied to a first device, the first device establishes a remote-control connection with a second device, and the first device controls the second device. The method includes the following steps:

detecting, according to a first display window displayed in the first device, a first operation, where a display interface of the second device is displayed in the first display window, and the first operation is used to indicate an operation of controlling the second device to perform an occlusion on an area to be occluded in the display interface of the second device;

determining area information of the area based on the first operation; and sending an occlusion instruction to the second device based on the area information, where the occlusion instruction is used to instruct the second device to perform an occlusion processing on the area based on the area information.

In the display method provided by the embodiment of the present application, the first device detects, based on the first display window displayed in the first device, whether a first operation is presented on the display interface of the second device displayed in the first display window. If the first operation is detected, then the area information of the area to be occluded in the display interface of the second device is determined based on the first operation, and the occlusion instruction is sent to the second device based on the area information, to facilitate the second device to perform the occlusion processing on the area based on the area information, such that information leakage caused due to presenting the information corresponding to the area to the user of the second device can be avoided.

In accordance with a second aspect, an embodiment of the present application provides a method for remotely controlling interface display, the method is applied to a second device, the second device establishes a remote-control connection with the first device, and the second device is controlled by the first device. The method includes steps of:

receiving an occlusion instruction sent by the first device, where the occlusion instruction carries area information of an area to be occluded in a display interface of the second device, the occlusion instruction is an instruction sent to the second device after the area information is determined based on a first operation that is used to instruct the first device to control the second device to perform an occlusion on the area and is detected by the first device based on a first display window displayed in the first device, and where the display interface of the second device is displayed the first display window; and performing an occlusion processing on the area according to the area information.

In accordance with a third aspect, an embodiment of the present application provides a system for remotely controlling interface display. The system includes a first device and a second device. The first device establishes a remote-control connection with the second device and controls the second device;

The first device is configured to detect a first operation based on a first display window displayed in the first device, where the first display window displays a display interface of the second device, and the first operation is used to indicate an operation of controlling the second device to perform an occlusion on an area to be occluded in the display interface of the second device;

The first device is configured to determine area information of the area based on the first operation;

The first device is configured to send an occlusion instruction to the second device based on the area information, where the occlusion instruction carries the area information of the area to be occluded in the display interface of the second device;

The second device is configured to perform an occlusion processing on the area according to the area information.

In accordance with a fourth aspect, an embodiment of the present application provides an electronic device, which includes a memory, a processor, and a computer program stored in the memory and executable by the processor. The processor, when executing the computer program, is configured to implement the method described in the first aspect or the method described in the second aspect.

In accordance with a fifth aspect, an embodiment of the present application provides a computer-readable storage medium that stores a computer program. The computer program, when executed by a processor, causes the method described in the first aspect or the method described in the second aspect to be implemented.

In accordance with a sixth aspect, an embodiment of the present application provides a computer program product. The computer program product when running on an electronic device, causes the electronic device to execute the method described in any one of the above first or second aspects.

It can be understood that, for beneficial effects of the above-mentioned second to sixth aspects, references may be made to the relevant descriptions in the above-mentioned first aspect, which will not be repeatedly described here.

BRIEF DESCRIPTION OF DRAWINGS

To more clearly illustrate the technical solutions in the embodiments of the present application, the drawings that need to be used in the description of the embodiments or exemplary technologies will be briefly introduced below. Obviously, the drawings in the following description are merely some embodiments of the present application. For persons of ordinary skill in the art, other drawings may be obtained based on these drawings without exerting creative efforts.

FIG. 7 is a schematic flowchart of a method for remotely controlling interface display provided by another embodiment of the present application:

FIG. 8 is a schematic flowchart of a method for remotely controlling interface display provided by another embodiment of the present application.

DETAILED DESCRIPTION OF EMBODIMENTS

In the following description, specific details such as specific system structures and technologies, etc., are presented, for the purpose of explanation rather than limitation, to provide a thorough understanding of the embodiments of the present application. However, it will be apparent to persons skilled in the art that the present application may be practiced in other embodiments without these specific details.

As used in this disclosure and the appended claims, the term "if" may be interpreted as "when" or "once" or "in response to determining" or "in response to detecting" depending on the context. Similarly, the phrase "if determined" or "if [the described condition or event] is detected" may be interpreted, depending on the context, to mean "once determined" or "in response to a determination" or "once [the described condition or event] is detected" or "in response to a detection of [the described condition or event]".

In addition, in the description of this disclosure and the appended claims, the terms "first", "second", "third", etc. are used only to distinguish the description, and cannot be understood as indicating or implying relative importance.

Reference to "one embodiment" or "some embodiments" or the like, as described in this disclosure means that a particular feature, structure or characteristic described in connection with the embodiment is included in one or more embodiments of the present application. Thereby, the phrases "in one embodiment," "in some embodiments," "in other embodiments," "in further other embodiments," etc., appearing in different points in this disclosure do not necessarily all refer to the same embodiment, but rather to "one or more but not all embodiments" unless specifically stated otherwise. The terms "including," "comprising," "having," and variations thereof all mean "including but not limited to," unless specifically stated otherwise.

To illustrate the technical solutions described in this application, particular embodiments are provided below.

Figure 1:
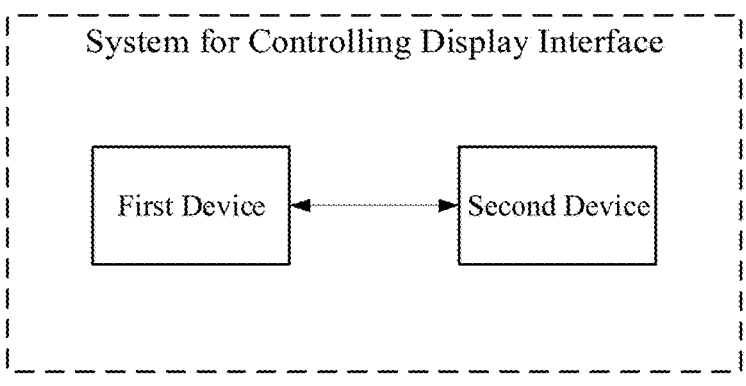
FIG. 1 is a schematic diagram of a system for remotely controlling interface display provided by an embodiment of the present application.

Referring to FIG. 1, which is a schematic diagram of a system for remotely controlling interface display provided by an embodiment of the present application. In this embodiment, the system for remotely controlling interface display includes a first device and a second device. The first device establishes a remote-control connection with the second device, and the first device controls the second device.

It can be understood that when a remote-control connection is established between the first device and the second device, the first device and the second device may directly establish a control connection, or the first device may be connected to a server, and the server is connected to the second device, Thus, a control connection is established between the first device and the second device via the server. Among them, when the remote-control connection between the first device and the second device is established based on the server, the first device and the second device perform information exchange via the server. Exemplarily, after the first device sends the information to the server, the server parses the received information according to a preset communication protocol, and generates, with respect to the parsed information and according to a communication protocol between the server and the second device, information corresponding to the communication protocol between the server and the second devices and send the same to the second device, and then the second device parses the received information and performs operations corresponding to the information.

In some embodiments, the Netty framework is used by the server to build a WebSocket communication protocol service, thereby the first device and the second device are enabled to respectively interact with the server based on the WebSocket communication protocol, and thus the information interaction between the first device and the second device based on the server is realized.

Figure 2:
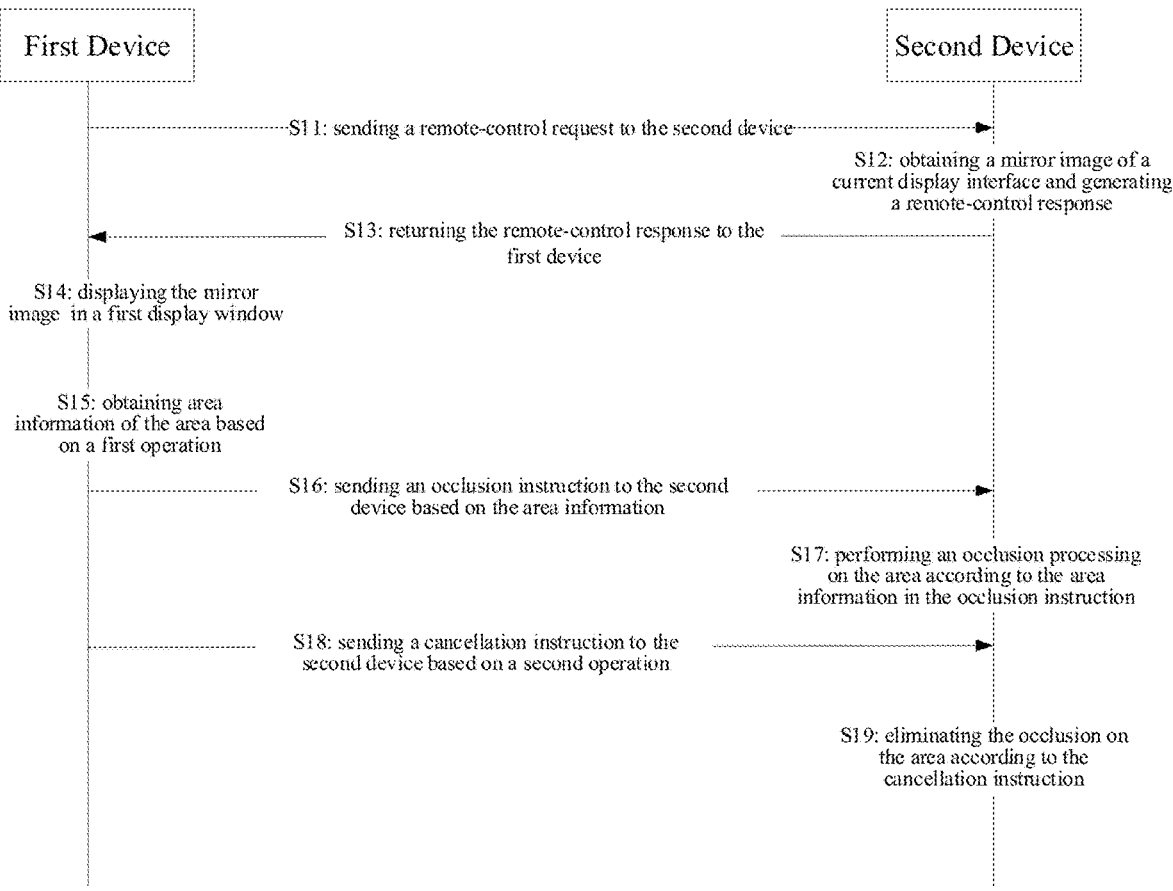
FIG. 2 is a schematic diagram of information interaction between a first device and a second device provided by an embodiment of the present application.

With reference to FIGS. 1 and 2, in the system for remotely controlling the interface display provided by an embodiment of the present application, a particular implementation process of information interaction between the first device and the second device is as follows:

S11: a remote-control request is sent by a first device to a second device.

In this embodiment, to enable the first device to control the second device, the remote-control request is sent by the first device to the second device, and then a verification is performed on the remote-control request by the second device, so that the first device can remotely control the second device after the verification is passed.

The timing for the first device to send a remote-control request to the second device may include but is not limited to the following two scenarios:

Scenario 1: when a certain area in a display desktop of the second device needs to be occluded, the first device sends a remote-control request to the second device.

Scenario 2: when the first device needs to remotely assist the second device, the first device sends a remote-control request to the second device.

In one embodiment, when the second device is an unattended device, the remote-control request may be automatically verified through a verification program preset in the second device, so that a control response is automatically returned to the first device after the verification is passed.

In another embodiment, when the second device is an attended device, after the remote-control request is sent by the first device to the second device, the verification on the remote-control request may be manually operated by a user of the second device, for example, it is indicated that the remote-control request has been verified when the input confirmation request is received by the second device.

In another embodiment, when the second device is an attended device, the remote-control request may be automatically verified through the verification program preset in the second device, so that the control response is automatically returned to the first device after the verification is passed.

S12: a mirror image of a current display interface is obtained by the second device and a remote-control response is generated by the same.

Figure 4:
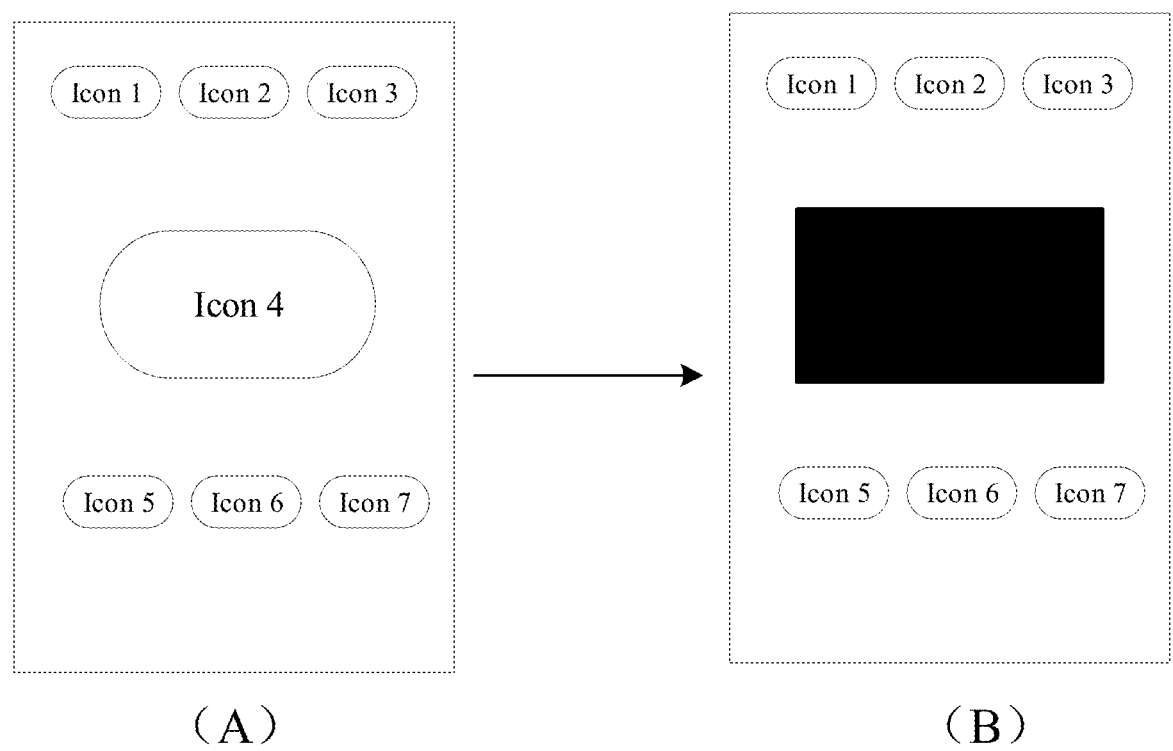
FIG. 4 is a schematic diagram of an area to be occluded in a display interface of the second device before and after being occluded according to an embodiment of the present application.

In this embodiment, the mirror image is a screenshot of the current display desktop of the second device. For example, the mirror image of the current display interface of the second device as shown in picture A of FIG. 4 is obtained.

It can be understood that, the second device, after receiving the remote-control request sent by the first device, obtains the mirror image of the current display interface of the second device if the remote-control request is verified and passed, and generates a remote-control response based on the mirror image in response to the remote-control request. The first device, after receiving the remote-control response, can parse and obtain the mirror image in the remote-control response, and display the mirror image in a first display window of the first device, which facilitates a user of the first device to view the desktop of the second device, and thus the second device can be controlled more conveniently.

S13: the remote-control response is returned by the second device to the first device.

In this embodiment, to facilitate the first device to remotely control the second device, the second device also returns a remote-control response to the first device after the remote-control request for the first device is verified.

S14: a mirror image is displayed by the first device in a first display window.

In this embodiment, to facilitate the first device to better control the second device, the mirror image of the display interface of the second device included in the remote-control response is displayed by the first device in the first display window after the remote-control response returned by the second device in response to the remote-control request is received by the first device, so that the desktop situations of the second device can be obtained through the mirror image, which facilitates the first device to control the second device.

Figure 3:
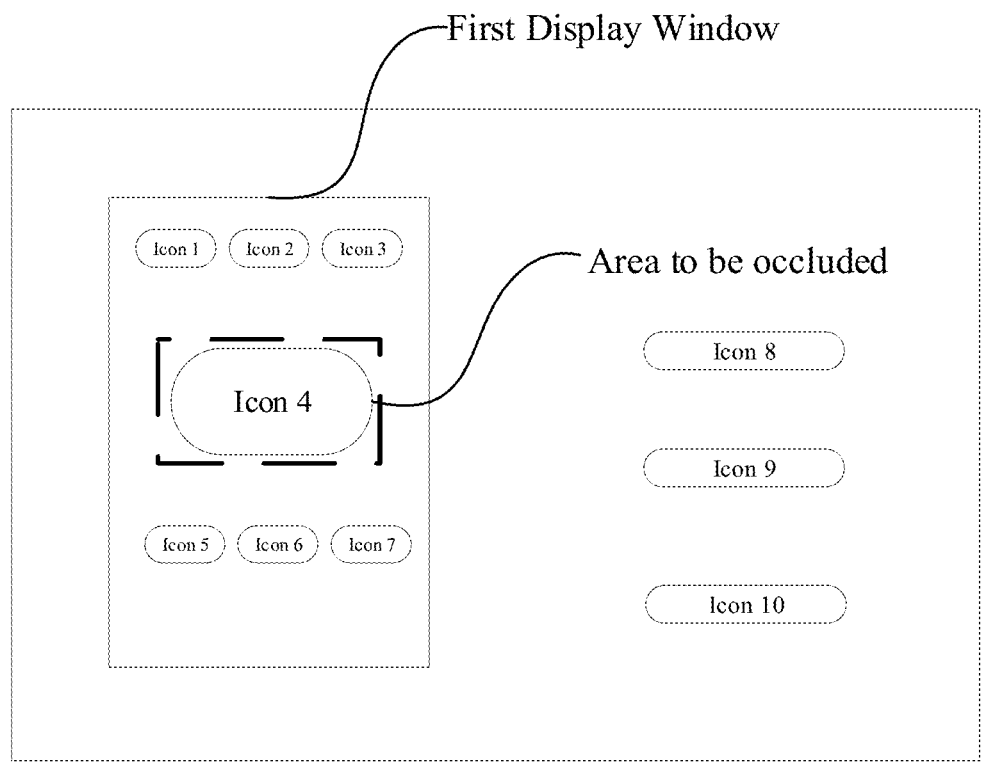
FIG. 3 is a schematic diagram of a display interface of the first device provided by an embodiment of the present application.

For example, in a particular scenario, the first device is a personal computer and the second device is a mobile phone. The personal computer, after receiving a remote-control response returned by the mobile phone, displays a mirror image of a display interface of the mobile phone included in the remote-control response in a first display window of the personal computer. Thus, it is convenient for a user of the personal computer to view the interface of the mobile phone through the mirror image. For example, picture A on the display interface of the second device in FIG. 4 is displayed in the first display window of the personal computer, to obtain the display interface of the personal computer as shown in FIG. 3.

In applications, when the second device is controlled through the first device, it may be based on an operation of the first device on the mirror image displayed in the first display window; that is, the position information corresponding to the operation of the first device on the mirror image is returned to the second device, to represent the control information of the first device to the second device. For example, a click instruction is generated based on a click operation of the first device's mouse in the mirror image and the coordinates corresponding to the operation, and the click instruction is returned to the second device, so that the second device can understand control information of the first device based on the click instruction, for example, an operation of selecting a folder may be performed by the second device based on the click instruction.

It can be understood that the above-mentioned steps S11 to step S14 may be performed before step S15, and each step after step S15 and step S15 may be triggered at a certain moment after the remote-control connection is established between the first device and the second device. That is to say, step S15 and the steps after step S15 are not necessarily executed immediately after the remote-control connection is established.

S15: area information of an area to be occluded in a display interface of the second device is determined by the first device based on a first operation.

In this embodiment, the first operation refers to an operation performed on the mirror image in the first display window, that is, the first operation is used to describe remote-control information of the first device to the second device. For example, to occlude part of the area in the display interface of the second device, the first operation indicates an operation of the first device to control the second device to occlude the area to be occluded in the display interface of the second device.

It can be understood that in one scenario, upon a detection of the first operation, it is indicated that the first device controls the second device to occlude the area to be occluded in the display interface of the second device, to avoid the information in some areas of the display interface of the second device being seen by the user of the second device, thereby causing information leakage. Thus, the area information of the area to be occluded in the display interface of the second device is determined by the first device according to the first operation, which facilitates a determination of the area to be occluded in the display interface of the second device based on the area information.

In applications, to better determine the area information and to quickly control the second device to occlude the area to be occluded, when determining the area information based on the first operation, the following two situations may be included:

The first situation: during an execution of the first operation, a position corresponding to the first operation for locating the area to be occluded is obtained in real time. Each time a position is determined, a piece of partial area information describing partial area of the area to be occluded is determined in real time, in this way, multiple pieces of partial area information may be determined during the execution of the first operation, and the multiple pieces of partial area information constitute the area information of the area to be occluded.

The second situation: starting from the first operation, each position corresponding to the first operation for locating the area to be occluded is determined, and based on each determined position, the area information for describing the area to be occluded is determined after the first operation is completed.

In some embodiments, the first operation is a mouse drag operation.

The first device, after obtaining mouse drag trajectory information corresponding to the mouse drag operation, determines the mouse drag trajectory information as the area information of the area to be occluded.

In this embodiment, the mouse drag trajectory information includes multiple position information.

It can be understood that, to instruct the second device to occlude the area to be occluded in the display interface of the second device, an area range may be determined based on the multiple position information corresponding to the mouse drag trajectory information, and an occlusion processing may be performed within the area range, such as drawing a mask image of the same size as the area range, so that the area to be occluded is occluded through the mask image.

It should be noted that the partial area information describing the partial area of the area to be occluded may be determined simultaneously and in real time according to each position as the mouse drags over each position, in this way, during a dragging process of the mouse, multiple pieces of partial area information are determined, and the multiple pieces of partial area information constitute the area information of the area to be occluded. Or alternatively, after the mouse dragging is completed, the area information describing the area to be occluded is determined for each position corresponding to the mouse trajectory.

In some embodiments, the first device starts to detect whether a first operation is presented when a preset event is detected by the first device. If the first operation is detected, then the area information is determined based on the first operation. The preset event is configured to indicate starting to record the first operation for the display interface of the second device in the first display window.

For example, a selection operation pop-up window for operating the display interface of the second device is displayed in the first display window, and the selection operation pop-up window displays two options of selecting to draw a rectangular frame and selecting to draw a circular frame. For example, when the operation of selecting to draw a rectangular frame is received by the first device, it is indicated that a preset event is detected, and then the first device starts to detect whether an operation of a mouse dragging and drawing a rectangular frame is occurred. The operation of the mouse dragging and drawing a rectangular frame, when being detected, is recorded, to facilitate the determination of the area information according to the operation of the mouse dragging and drawing the rectangular frame.

S16: an occlusion instruction is sent by the first device to the second device based on the area information.

In this embodiment, the occlusion instruction is used to instruct the second device to perform an occlusion operation on the area based on the area information.

When the occlusion instruction is sent by the first device to the second device based on the area information, the following two situations may be included:

The first situation: every time a position for locating the area to be occluded is determined based on the first operation, partial area information of the area to be occluded is determined once and an occlusion instruction to the second device based on the partial area information, in this way, multiple occlusion instructions are sent by the first device to the second device.

For example, to instruct the second device to occlude the area to be occluded in the display desktop of the second device, the mouse movement of the first device may be controlled by the user through an external device, and during a process of drawing a rectangular frame that can cover the area to be occluded in the mirror image area in the first display window, when the mouse passes over a position, partial area information of the area to be occluded is determined once, and an occlusion instruction is sent to the second device based on the partial area information. By analogy, after the rectangular frame is drawn, multiple occlusion instructions are sent by the first device to the second device, so that each time the second device receives an occlusion instruction, an occlusion processing can be synchronously performed by the second device on the area to be occluded.

The second scenario: after all positions for locating the areas to be occluded are determined based on the first operation, the area information is determined based on all the positions for locating the areas to be occluded and then the occlusion instruction is sent to the second device based on the area information, that is, only one occlusion instruction is sent by the first device to the second device.

For example, to instruct the second device to perform an occlusion operation on the area to be occluded in the display desktop of the second device, a mouse of the first device is dragged by the user to draw a rectangular frame that can cover the area to be occluded in the mirror image area in the first display window. After the rectangular frame is drawn, the area information is determined based on the position of each point corresponding to the rectangular frame, and the occlusion instruction is sent to the second device based on the area information.

S17: an occlusion processing is performed by the second device on the area according to the area information included in the occlusion instruction.

In this embodiment, the second device, after receiving the occlusion instruction, parses the occlusion instruction to obtain the area information of the area, and then performs the occlusion processing on the area based on the parsed area information. For example, an occlusion layer is drawn at the area according to the area information, to occlude the area through the occlusion layer.

For example, referring to FIG. 4, the occlusion processing is performed by the second device on the icon 4 in picture A of FIG. 4 according to the area information for occluding the icon 4 included in the occlusion instruction, and then the occluded picture B in FIG. 4 is obtained.

When the occlusion processing is performed by the second device on the area based on the area information, the following two situations may be included:

The first scenario: the first operation is detected by the first device based on the first display window displayed in the first device, and multiple occlusion instructions are sequentially sent by the first device to the second device according to the first operation, to describe the areas to be occluded respectively according to the area information carried in the occlusion instructions. The occlusion processing is gradually performed by the second device based on the area information carried in each received occlusion instruction, so that when the first operation in the first device is terminated, the occlusion operation performed on the area to be occluded in the second device is also terminated simultaneously.

The second scenario: After a termination of the first operation is detected by the first device based on the first display window displayed in the first device, the occlusion instruction describing the detected first operation is sent by the first device to the second device, to describe the area to be occluded as a whole through the area information carried in the occlusion instruction, and then the occlusion processing is performed by the second device on the area to be occluded based on the occlusion instruction.

In some embodiments, after the occlusion instruction is parsed by the second device to obtain the area information, the display desktop of the second device is obtained, and an occlusion processing software is utilized to draw a mask layer by set corresponding parameters according to the area information. The mask layer is displayed over the area to be occluded, to occlude the area to be occluded in the display desktop.

In some embodiments, as the area information described in the occlusion instruction is corresponded to the area information in the mirror image in the first display window of the first device, and the corresponded position information may be different from the position coordinates of the area to be occluded in the display interface of the second device, thus a position conversion relation between the first device and the second device is determined in advance. The position conversion relation is configured to describe a transformation relationship between the coordinates of the pixels in the first display window of the first device and the coordinates of pixels in the display interface of the second device.

The second device, according to the area information and the position conversion relation included in the occlusion instruction, determines a target area information in the display interface of the second device, and performs the occlusion processing on the area to be occluded according to the target area information.

For example, for a vertex in the mirror image of the display interface of the second device, the coordinates of the vertex in the second device are (0, 0), and when the mirror image is displayed in the first display window of the first device, the coordinates corresponding to this vertex are (200, 300), which means that a difference value between the abscissa of a point in the second device and the abscissa of the point in the first device is 200, and a difference value between the ordinates of this point in the first and second devices is 300, and the position conversion relation is then expressed as the difference value during the abscissa transformation and the difference value during the ordinate transformation.

In some embodiments, after the second device performs the occlusion processing on the area to be occluded based on the area information included in the occlusion instruction, text information of the occluded area is obtained by the second device to facilitate the user of the first device to view the content corresponding to the area to be occluded. The text information is used to describe the content of the occluded area in the display interface of the second device.

In the meantime, the text information is sent by the second device to the first device, and then a floating window is generated via the first device based on the received text information, and the floating window is displayed at a designated position of the first display window of the first device.

In some embodiments, after the occlusion processing on the area is performed by the second device according to the area information included in the occlusion instruction, a first mirror image of the display desktop after the occlusion processing is returned by the second device to the first device, to enable the first device to display the first mirror image in the first display window, so as to facilitate the user of the first device to better control the second device through the first device.

It can be understood that a screenshot of the displayed desktop may be taken by the second device based on a third-party screenshot software during an obtaining of the mirror image of the displayed desktop of the second device, and then the desktop screenshot obtained by the screenshot operation is used as the mirror image.

It can be understood that step S18 and the steps after step S18 may be triggered and executed at a certain moment after the second device performs the occlusion processing on the area according to the area information included in the occlusion instruction.

S18: a cancellation instruction is sent by the first device to the second device based on a second operation.

In this embodiment, the first device detects whether a second operation is presented based on the first display window displayed in the first device. If the second operation that indicates controlling the second device to cancel the occlusion on the area is detected, then the cancellation instruction is sent to the second device based on the second operation.

It can be understood that the timing for the first device to send the cancellation instruction to the second device may include but is not limited to the following scenarios:

Scenario 1: when it is no longer necessary to continue occlude the area as the operation on the area to be occluded has been completed, then the cancellation instruction is sent by the first device to the second device based on the second operation.

Scenario 2: When it is determined that an occlusion error is occurred, then the cancellation instruction is sent by the first device to the second device based on the second operation.

S19: an occlusion on the area is eliminated by the second device according to the cancellation instruction.

In this embodiment, the second device, when receiving the cancellation instruction sent by the first device, determines the occluded area and performs an elimination operation on the area based on position information of the occluded area, to enable the display interface of the second device to be displayed in the first display window with no occlusion, so as to facilitate a better control of the second device through the first device, or to facilitate the user of the second device to better use the second device.

Figure 5:
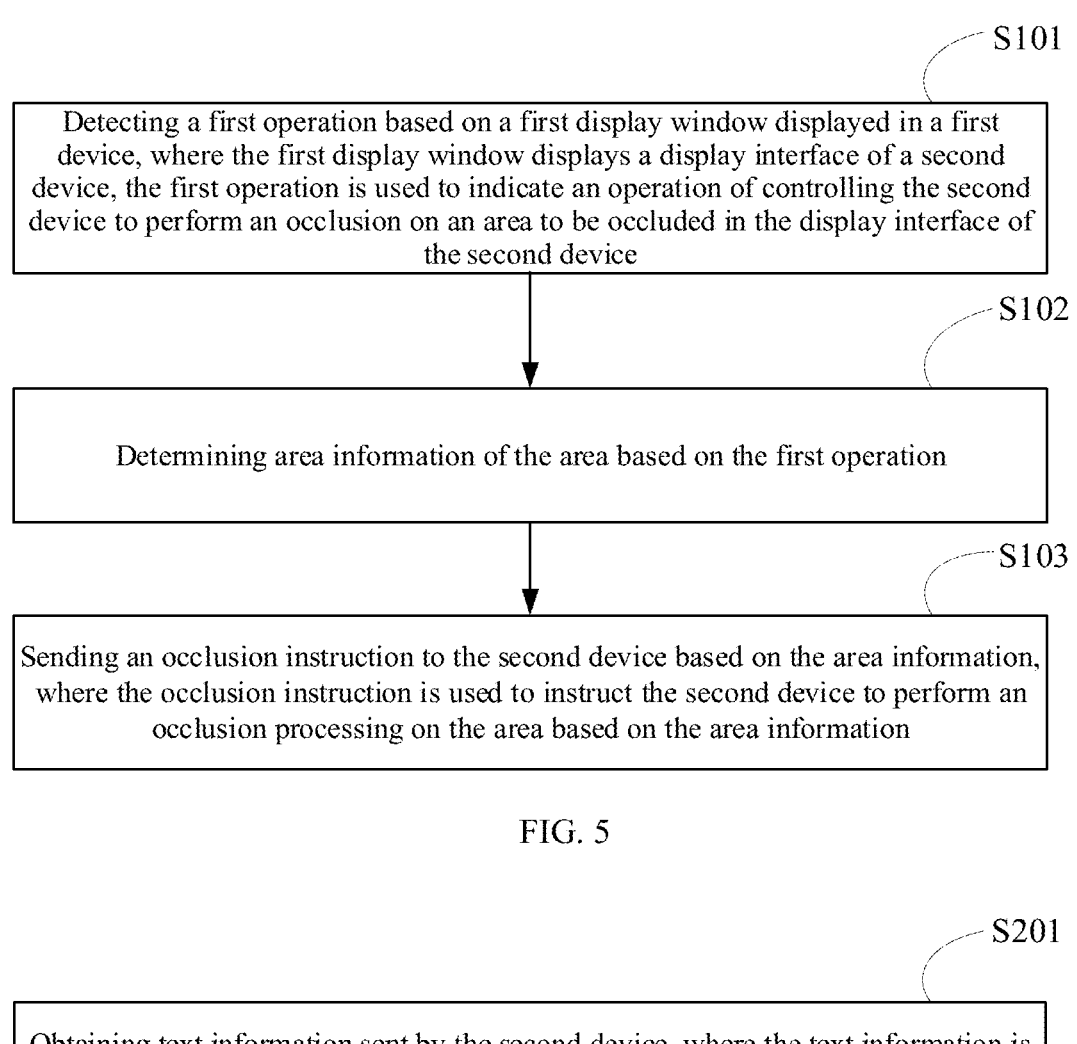
FIG. 5 is a schematic flowchart of a method for remotely controlling interface display provided by an embodiment of the present application.

Referring to FIG. 5, FIG. 5 shows a schematic flow chart of the method for remotely controlling the interface display provided by the present application. As an example rather than a limitation, the execution subject of the method is the first device, a remote-control connection is established between the first device and the second device, and the first device controls the second device.

As shown in FIG. 5, the method for remotely controlling the interface display provided by the present application may include steps S101 to S104.

S101: a first operation is detected based on a first display window displayed in the first device. The first display window displays a display interface of the second device. The first operation is used to indicate an operation of controlling the second device to perform an occlusion on the area to be occluded in the display interface of the second device.

In step S101, the first display window is part or all of a display screen of the first device.

In this embodiment, to facilitate the first device to better control the second device, a mirror image of the display interface of the second device is displayed by the first device in the first display window, so as to facilitate an understanding of desktop situations of the second device through the mirror image, and then facilitate the first device to control the second device.

Particularly, the first operation is detected based on the first display window displayed in the first device, to obtain the operation on the display interface in the first display window and an area selection is performed on the display interface through the first operation, to determine the selected area as the area to be occluded. For example, the rectangular frame surrounded by dotted lines in the display interface of the second device in FIG. 3 is an area determined through the first operation where the second device is controlled to occlude, i.e., the area to be occluded in the display interface of the second device.

In some embodiments, a preset script is utilized by the first device to perform the first operation on the display interface of the first display window.

S102: area information of an area is determined based on the first operation.

In this embodiment, to prevent the information in some areas of the display interface of the second device from being seen by the user of the device, thereby causing information leakage, it is necessary to control the second device through the first device, that is, the mirror image of the first display window displayed in the first device is detected, to acquire the area where the first device controls the second device to occlude through the detected first operation, and to determine the area information of the area, so as to facilitate the first device to control the second device to occlude the area based on the area information.

S103: an occlusion instruction is sent to the second device based on the area information. The occlusion instruction is used to instruct the second device to perform an occlusion processing on the area based on the area information.

In this embodiment, the occlusion instruction is used to instruct the second device to perform the occlusion operation on the area based on the area information.

When the occlusion instruction is sent by the first device to the second device based on the area information, the following two situations may be included:

The first situation: every time a position for locating the area to be occluded is determined based on the first operation, the area information of the area to be occluded is determined once, and the occlusion instruction is sent to the second device based on the area information, in this way, multiple occlusion instructions are sent by the first device to the second device.

For example, the first device is connected to the server, the server is connected to the second device, and then a remote-control connection is established between the first device and the second device through the server. In case that a password input box in the display interface of the second device needs to be occluded, and if the first operation on the display interface in the first display window is detected by the first device through an operation detection software, then the position coordinates corresponding to the first operation is captured through the operation detection software. The position coordinates corresponding to the first operation are processed in a data format according to the communication protocol format between the first device and the server, and the position coordinates processed in the data format are sent to the server as an occlusion instruction. Next, the server parses the occlusion instruction according to the communication protocol format to obtain the position coordinates corresponding to the first operation, and continues to perform a data format processing on the position coordinates corresponding to the first operation obtained by parsing based on the communication protocol format between the server and the second device, and then sends the position coordinates after the data format processing to the second device as an occlusion instruction, so that the second device parses the received occlusion instruction according to the communication protocol format between the server and the second device to obtain the position coordinates corresponding to the first operation. Finally, the second device first obtains the window management service (Window Manager) object, that is, obtains the display interface of the second device, and then draws a mask layer according to the position coordinates corresponding to the received first operation, to enable the mask layer to occlude the password input box in the display interface of the second device.

In some embodiments, a communication type of a mask instruction is predefined, so that the occlusion processing can be performed based on the communication type and the area information contained in the mask instruction when the mask instruction is received by the second device.

For example, the mask instruction contains a byte of 0x07 to enable a remote mask function, thus, after the mask instruction is sent by the first device to the second device, the mask function is enabled by the second device accordingly, which facilitates the occlusion processing on the area based on the area information contained in the mask instruction.

In the method for remotely controlling the interface display provided by the embodiment of the present application, the first device detects, based on the first display window displayed in the first device, whether a first operation is presented on the display interface of the second device displayed in the first display window. If the first operation is detected, then the area information of the area to be occluded in the display interface of the second device is determined based on the first operation, and the occlusion instruction is sent to the second device based on the area information, to facilitate the second device to perform the occlusion processing on the area based on the area information, such that information leakage caused due to presenting the information corresponding to the area to the user of the second device can be avoided.

In an embodiment of the present application, the first operation is a mouse drag operation.

A particular implementation for determining the area information of the area according to the first operation includes that:

Mouse drag trajectory information corresponding to the mouse drag operation is obtained.

The mouse dragging trajectory information is determined as the area information of the area.

In this embodiment, the mouse drag operation describes a drag operation performed by a mouse of the first device on the display interface in the first display window, and the mouse drag trajectory information includes multiple position information to describe the area information of the area. For example, as shown in FIG. 3, the mouse drags to draw a rectangular frame surrounded by dotted lines.

It can be understood that, to instruct the second device to occlude the area to be occluded in the display interface of the second device, an area range may be determined based on the multiple position information corresponding to the mouse drag trajectory information, so that the second device can perform the occlusion processing based on the area range in the display interface of the second device.

In some embodiments, when a preset event is detected, the mouse drag trajectory information corresponding to the mouse drag operation is obtained, and the mouse drag trajectory information is determined as the area information of the area.

Figure 6:
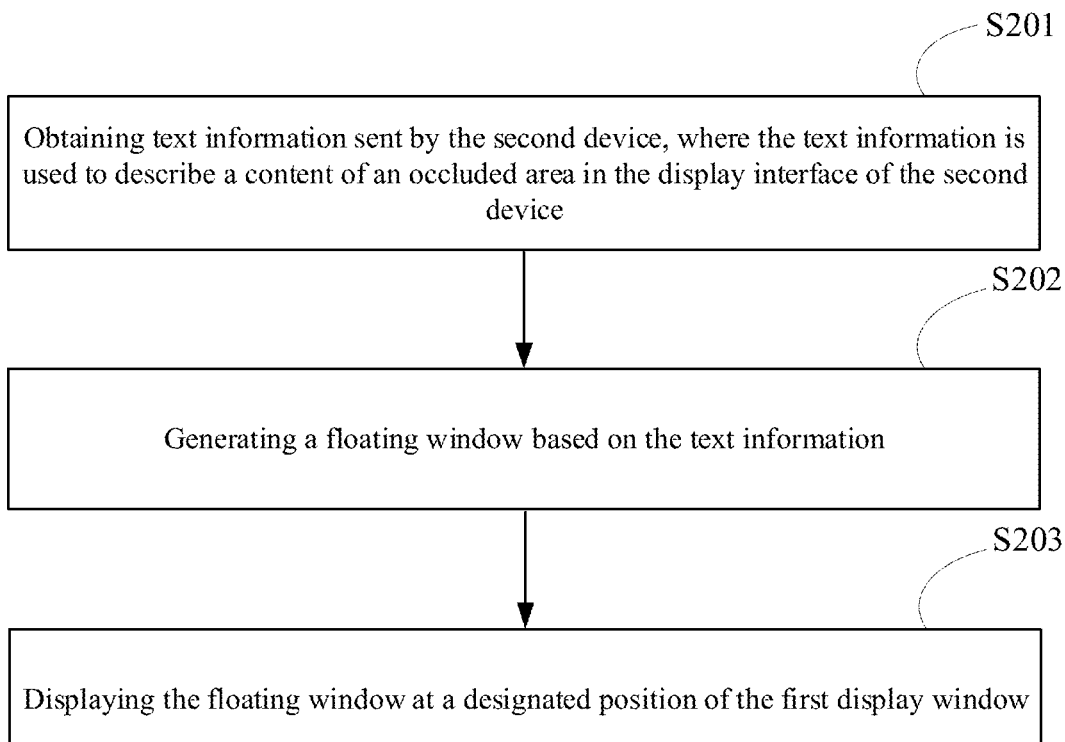
FIG. 6 is a schematic flowchart of a method for remotely controlling interface display provided by another embodiment of the present application.

With reference to FIG. 6, in an embodiment of the present application, after the occlusion instruction is sent to the second device based on the area information, the method also includes steps S201-S203:

S201: text information sent by the second device is obtained. The text information is used to describe a content of the occluded area in the display interface of the second device.

In step S201, in order for the user of the first device to better control the second device, the text information sent by the second device is obtained after the area to be occluded is occluded by the second device according to the occlusion instruction, thereby the content of the occluded area in the display interface of the second device can be acquired by the user according to the text information.

For example, the occluded area in the display interface of the second device is a password input box. In order to facilitate the user of the first device to check whether the content entered into the password input box is incorrect, the text information sent by the second device is obtained, so that the input content can be acquired by the user through the text information.

S202: a floating window is generated based on the text information.

In step S202, the floating window refers to a window suspended on the display interface of the first device, and the content of the occluded area in the display interface of the second device is recorded in the window.

S203: the floating window is displayed at a designated position of the first display window.

In this embodiment, the designated position is a position set as required. For example, the designated position is a middle position, an upper-left corner position, or a lower-right corner position of the first display window.

It can be understood that when the floating window is placed at the designated position, the user's ability to view the second device based on the display interface displayed in the first display window will not be affected, and then the second device is controllable via the first device.

In some embodiments, the floating window is adjusted from the designated position to a target position according to a floating window dragging instruction.

In an embodiment of the present application, after the occlusion instruction is sent to the second device based on the area information, the method also includes that:

Based on the first display window displayed in the first device, a second operation is detected, and the second operation is used to indicate an operation of controlling the second device to cancel an occlusion on the area.

In this embodiment, when it is no longer necessary to occlude the area, a presence of the second operation is detected based on the first display window displayed in the first device. If the second operation that indicates controlling the second device to cancel the occlusion on the area is detected, then it is determined that an instruction of controlling the second device to cancel the occlusion on the area is required.

Based on the second operation, a cancellation instruction is sent to the second device, where the cancellation instruction is used to instruct the second device to eliminate the occlusion on the area.

In this embodiment, the cancellation instruction is sent to the second device based on the second operation to eliminate the occlusion on the area so that the user of the second device can better use the second device, or the user of the first device can better control the second device through the first device.

In an embodiment of the present application, before the first operation is detected based on the first display window displayed in the first device, the method also includes that:

A remote-control request is sent to the second device.

In this embodiment, the remote-control request is used to describe the first device's control requirements for the second device.

A remote-control response returned by the second device in response to the remote-control request is received, where a mirror image of the display interface of the second device is contained in the remote-control response.

The mirror image is displayed in the first display window.

In this embodiment, to facilitate the first device to control the second device, the mirror image included in the remote-control response is displayed in the first display window after the remote-control response returned by the second device in response to the remote-control request is received, so that it will be easier for the user of the first device to view the desktop of the second device, and thus more convenient to control the second device.

Referring to FIG. 7, FIG. 7 shows a schematic flow chart of the method for remotely controlling the interface display provided by the present application. As an example rather than a limitation, the execution subject of the method is the second device, a remote-control connection is established between the first device and the second device, and the first device controls the second device.

As shown in FIG. 7, the method for remotely controlling the interface display provided by the present application may include steps S301-S302:

S301: an occlusion instruction sent by the first device is received. The occlusion instruction carries the area information of the area to be occluded in the display interface of the second device. The occlusion instruction is an instruction sent to the second device after the area information is determined based on the first operation, where the first operation is detected by the first device based on the first display window displayed in the first device and is used for instructing the first device to control the second device to occlude the area. The display interface of the second device is displayed in the first display window.

In step S301, the second device, after receiving the occlusion instruction, parses the occlusion instruction to obtain the area information of the area, and then acquires the area that needs to be occluded based on the parsed area information. For example, based on the area information, it is learned that the area that needs to be occluded is the password input box.

S302: occlusion processing is performed on the area according to the area information.

In step S302, to prevent the information in some areas in the display interface of the second device from being seen by the user of the second device, the occlusion instruction is parsed by the second device to obtain the area information of the area, after the occlusion instruction is received, and then the occlusion processing is performed on the area based on the parsed area information. For example, an occlusion layer is drawn at the area according to the area information to occlude the area through the occlusion layer.

With reference to FIG. 8, in an embodiment of the present application, after the occlusion processing is performed on the area according to the area information, the method also includes steps S401-S402:

S401: text information of the occluded area is obtained. The text information is used to describe the content of the occluded area in the display interface of the second device.

In this embodiment, as the content of the area cannot be seen by the user of the first device after the occlusion processing is performed on the area to be occluded. Thus, in order to facilitate the user of the first device to better control the second device through the first device, the text information of the occluded area is obtained, and the content of the occluded area in the display interface of the second device is describable through the text information.

S402: the text information is sent to the first device. The text information is used by the first device to generate a floating window and display the floating window at a designated position of the first display window.

In this embodiment, the text information is sent by the second device to the first device to facilitate the first device to view the content described in the text information, so that the first device can generate a floating window based on the text information and display the floating window on the designated position of the first display window.

In an embodiment of the present application, after the occlusion processing is performed on the area according to the area information, the method also includes that:

If a cancellation instruction sent by the first device is received, then the occlusion on the area is eliminated according to the cancellation instruction. The cancellation instruction is an instruction sent by the first device to the second device after the second operation is detected based on the first display window displayed in the first device. The second operation is used to indicate an operation of controlling the second device to cancel the occlusion on the area.

In an embodiment of the present application, the first operation is a mouse drag operation, and the area information includes mouse drag trajectory information corresponding to the mouse drag operation.

A particular implementation of occluding the area according to the area information includes that:

An area is determined based on the mouse dragging trajectory information.

A mask layer is generated and displayed over the area to be occluded.

In the embodiment, in order to prevent the user of the second device from seeing the content corresponding to the area, a mask layer is generated after the area to be occluded is determined based on the mouse drag trajectory information, and the mask layer is displayed over the area to be occluded, so that the purpose of occluding the area to be occluded is achieved.

It can be understood that the mouse drag trajectory information describes the detected operation that requires occlusion processing of the area to be occluded in the display interface of the second device based on the first display window displayed in the first device. Thus, it is possible to determine the area based on the mouse dragging trajectory information, and generate a mask layer for occluding the area based on the mouse dragging trajectory information.

In an embodiment of the present application, before the occlusion instruction sent by the first device is received, the method also includes that:

A remote-control request sent by the first device is received.

A mirror image of a current display interface is obtained.

In response to the remote-control request, a remote-control response is returned to the first device, and the remote-control response includes the mirror image.

In this embodiment, the second device, after receiving the remote-control request sent, acquires the first device's need to control the second device through the remote-control request. Thus, in order to facilitate the user of the first device to better control the second device, the mirror image of the current display interface is obtained, and in response to the remote-control request, the remote-control response including the mirror image is returned to the first device, so that the mirror image in the remote-control response is displayed by the first device in the first display window.

It should be understood that the sequence number of each step in the above embodiment does not mean the order of execution. The execution order of each process should be determined by its function and internal logic, and should not constitute any limitation on the implementation process of the embodiment of the present application.

Corresponding to the method for remotely controlling the interface display in the above embodiment, a structural block diagram of a device for remotely controlling interface display is provided by an embodiment of the present application. For convenience of explanation, only the parts related to the embodiment of the present application are shown.

The device includes that: a detection module, a determination module and a sending module.

The detection module is configured to detect a first operation based on a first display window displayed in a first device. The first display window displays a display interface of a second device. The first operation is used to indicate an operation of controlling the second device to occlude an area to be occluded in the display interface of the second device.

The determination module is configured to determine area information of the area based on the first operation.

The sending module is configured to send an occlusion instruction to the second device based on the area information. The occlusion instruction is used to instruct the second device to perform an occlusion processing on the area based on the area information.

In one embodiment, the first operation is a mouse drag operation.

The determination module is also configured to obtain mouse drag trajectory information corresponding to the mouse drag operation; and determine the mouse drag trajectory information as the area information of the area.

In one embodiment, the device also includes a pop-up window module.

The pop-up window module is configured to obtain text information sent by the second device, where the text information is used to describe a content of the occluded area in the display interface of the second device; generate a floating window based on the text information; and display the floating window at a designated position of the first display window.

In one embodiment, the device also includes a cancellation module.

The cancellation module, after the occlusion instruction is sent to the second device based on the area information, is configured to: detect a second operation based on the first display window displayed in the first device, where the second operation is used to indicate an operation of controlling the second device to cancel an occlusion on the area; and send a cancellation instruction to the second device based on the second operation, where the cancellation instruction is used to instruct the second device to eliminate the occlusion on the area.

In an embodiment, the device also includes a connection module.

The connection module is configured to send a remote-control request to the second device; receive a remote-control response returned by the second device in response to the remote-control request, where a mirror image of a display interface of the second device is contained in the remote-control response; and display the mirror image on the first display window.

Corresponding to the method for remotely controlling the interface display in the above embodiment, another embodiment of the present application provides a structural block diagram of a device for remotely controlling interface display. For convenience of explanation, only the parts related to the embodiment of the present application are shown.

The device includes that: a receiving module and an occlusion module.

The receiving module is configured to receive an occlusion instruction sent by the first device. The occlusion instruction carries the area information of the area to be occluded in the display interface of the second device. The occlusion instruction is an instruction sent to the second device after the area information is determined based on the first operation, where the first operation is detected by the first device based on the first display window displayed in the first device and is used for instructing the first device to control the second device to occlude the area. The display interface of the second device is displayed in the first display window.

The occlusion module is configured to perform an occlusion processing on the area based on the area information.

In an embodiment, the device also includes a sending module.

The sending module is configured to obtain text information of the occluded area, the text information is used to describe a content of the occluded area in the display interface of the second device; and send the text information to the first device, the text information is used by the first device to generate a floating window and to display the floating window at a designated position of the first display window.

In one embodiment, the receiving module is also configured to perform an occlusion processing on the area according to the area information, and eliminate, if a cancellation instruction sent by the first device is received, the occlusion on the area according to the cancellation instruction. The cancellation instruction is an instruction sent by the first device to the second device after the second operation is detected based on the first display window displayed in the first device. The second operation is used to indicate an operation of controlling the second device to cancel the occlusion on the area.

In one embodiment, the first operation is a mouse drag operation, and the area information includes mouse drag trajectory information corresponding to the mouse drag operation.

The device also includes an occlusion module.

The occlusion module is configured to determine the area based on the mouse dragging trajectory information: generate a mask layer, and display the mask layer over the area to be occluded.

In one embodiment, the receiving module is also configured to receive a remote-control request sent by the first device; obtain a mirror image of a current display interface; and return a remote-control response to the first device in response to the remote-control request, where the remote-control response includes the mirror image.

Figure 9:
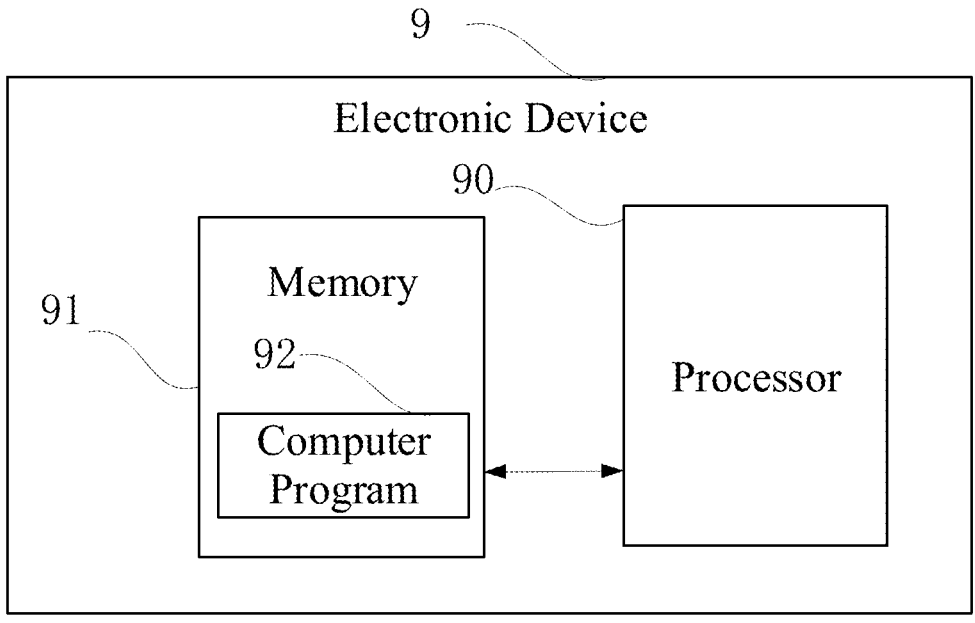
FIG. 9 is a schematic structural diagram of an electronic device provided by an embodiment of the present application.

FIG. 9 is a schematic structural diagram of an electronic device provided by an embodiment of the present application. As shown in FIG. 9, the electronic device 9 of this embodiment includes: at least one processor 90 (only one processor is shown in FIG. 9), a memory 91 and a computer program 92 stored in the memory 91 and executable by at least one processor 90. The computer program 92, when executed by the processor 90, causes the steps in any of the above method embodiments to be implemented.

The electronic device 9 may be a computing device such as a desktop computer, a notebook, a PDA, a cloud server, etc. The electronic device may include, but is not limited to, a processor 90 and a memory 91. Persons skilled in the art can understand that FIG. 9 is only an example of the electronic device 9 which does not constitute any limitations to the electronic device 9. More or fewer components may be included than shown in this figure, or some components may be combined, or different components may be used, for example, the electronic device may also include input and output devices, network access devices, etc.

The processor 90 may be a central processing unit (Central Processing Unit, CPU). The processor 90 may also be other general-purpose processors, digital signal processors (Digital Signal Processor, DSP), application specific integrated circuits (Application Specific Integrated Circuit, ASIC), field programmable gate arrays (Field-Programmable Gate Array, FPGA) or other programmable logic devices, discrete gate or transistor logic devices, discrete hardware components, etc. The general-purpose processor may be a microprocessor or the processor may be any conventional processor, etc.

The memory 91 may be an internal storage unit of the electronic device 9 in some embodiments, such as a hard disk or a memory of the electronic device 9. In other embodiments, the memory 91 may also be an external storage device of the electronic device 9, such as a plug-in hard disk, a smart memory card (Smart Media Card, SMC), a secure digital (Secure Digital, SD) card, or a flash card (Flash Card), etc., equipped on the electronic device 9. Further, the memory 91 may also include both an internal storage unit of the electronic device 9 and an external storage device. The memory 91 is used to store operating systems, application programs, boot loaders (Boot Loader), data and other programs, such as program codes of a computer program. The memory 91 may also be used to temporarily store data that has been output or is to be output.

It should be noted that the information interaction, execution process, etc. between the above-mentioned devices/ units are based on the same concept as the method embodiments of the present application. For details of the specific functions and technical effects they achieve, references may be made to the method embodiments, which will not be repeatedly described here.

It can be clearly understood for persons skilled in the art that for the convenience and simplicity of description, only a division of the above functional units and modules is presented as an example. In actual applications, the above functions may be allocated to different functional units and modules according to needs. That is, the internal structure of the device is divided into different functional units or modules to complete all or part of the functions described above. Each functional unit and module in an embodiment may be integrated into one processing unit, or each unit may exist physically alone, or two or more units may be integrated into one unit. The above-mentioned integrated unit may be in the form of hardware, and may also be implemented in the form of software functional units. In addition, the specific names of various functional unit and module are only for the convenience of distinguishing each other and are not intended to limit the protection scope of the present application. For specific working processes of the units and modules in the above system, references may be made to the corresponding processes in the foregoing method embodiments, which will not be described again here.

An embodiment of the present application also provides an electronic device. The electronic device includes: at least one processor, a memory, and a computer program stored in the memory and executable by at least one processor. The processor when executing the computer program, enables steps in any of the above various method embodiments to be implemented.

An embodiment of the present application also provides a computer-readable storage medium, on which a computer program is stored. The computer program, when executed by a processor, causes the steps in any of the above various method embodiments to be implemented.

An embodiment of the present application provides a computer program product. The computer program product, when running on and executed by an electronic device, causes steps in any of the above various method embodiments to be implemented.

Integrated units, when being implemented in the form of software functional units and sold or used as independent products, may be stored in a computer-readable storage medium. Based on this understanding, all or part of the processes in the above method embodiments of the present application may be implement by instructing relevant hardware through a computer program. The computer program may be stored in a computer-readable storage medium. The computer program, when executed by the processor, causes the steps in any of the above various method embodiments to be implemented. Among them, the computer program includes a computer program code, and the computer program code may be in the form of source code, object code, executable file or some intermediate form, etc. The computer-readable medium may include at least: any entity or device capable of carrying the computer program code to a device/electronic device, a recording medium, a computer memory, a read-only memory (ROM, Read-Only Memory), a random-access memory (RAM, Random Access Memory) and software distribution media, such as U disk, a mobile hard disk, a magnetic disk or CD, etc.

In the above embodiments, each embodiment is described with its own emphasis. For parts that are not detailed or documented in a certain embodiment, references may be made to the relevant descriptions of other embodiments.

It will be appreciated by persons of ordinary skill in the art that the units and algorithm steps of each example described in conjunction with the embodiments disclosed herein may be implemented with electronic hardware, or a combination of computer software and electronic hardware. Depending on the specific application and design constraints of the technical solution, these functions may be performed in hardware or software. Skilled artisans may implement the described functionality using different methods for each specific application, but such implementations should not be considered beyond the scope of the present application.

In the embodiments provided in the preset application, it should be understood that the disclosed apparatuses or electronic devices and methods may be implemented in other ways. For example, the apparatus/electronic device embodiments described above are only illustrative, such as the division of modules or units, which is merely one of logical function divisions. In actual implementation, other division methods may be presented, such as multiple units or components, may be combined or may be integrated into another system, or some features may be ignored, or may not be implemented. On the other hand, the coupling or direct coupling or communication connection between each other shown or discussed may be an indirect coupling or communication connection via some interfaces, devices or units, or may be connected in electrical, mechanical or other forms.

The units described as separate parts may or may not be physically separated, and components shown as units may or may not be physical units, that is, the components may be located in one place, or may be distributed across multiple network units. Some or all of the units may be selected according to actual needs to achieve the purpose of the solution of this embodiment.

The above embodiments are only used to illustrate rather than limiting the technical solutions of the present application. Although the present application has been described in detail with reference to the foregoing embodiments, it should be understood by persons of ordinary skill in the art that: the technical solutions described in the foregoing embodiments may still be modified thereby, or some of the technical features in the foregoing embodiments may be equivalently substituted. These modifications or substitutions do not cause the essence of the corresponding technical solutions to deviate from the spirit and scope of the technical solutions of the embodiments of the present application, and thus shall all be included within the protection scope of the present application.

The invention claimed is:

1. A method for remotely controlling interface display, applied to a first device that establishes a remote-control connection with a second device and controls the second device, and the method comprising:

detecting, based on a first display window displayed in the first device, a first operation, wherein a display interface of the second device is displayed in the first display window, and the first operation is used to indicate an operation of controlling the second device to perform an occlusion on an area to be occluded in the display interface of the second device;

determining, based on the first operation, area information of the area; and sending, based on the area information, an occlusion instruction to the second device, wherein the occlusion instruction is used to instruct the second device to perform an occlusion processing on the area based on the area information;

wherein after said sending, based on the area information, the occlusion instruction to the second device, the method further comprises:

obtaining text information sent by the second device, wherein the text information is used to describe a content of an occluded area in the display interface of the second device;

generating a floating window based on the text information; and displaying the floating window at a designated position of the first display window.

2. The method according to claim 1, wherein the first operation is a mouse drag operation;

said determining, based on the first operation, the area information of the area comprises:

obtaining mouse drag trajectory information corresponding to the mouse drag operation; and determining the mouse drag trajectory information to be the area information of the area.

3. The method according to claim 2, wherein before said detecting, based on the first display window displayed in the first device, the first operation, the method further comprises:

sending a remote-control request to the second device;

receiving a remote-control response returned by the second device in response to the remote-control request, wherein a mirror image of the display interface of the second device is contained in the remote-control response; and displaying the mirror image in the first display window.

4. The method according to claim 1, wherein after said sending, based on the area information, the occlusion instruction to the second device, the method further comprises:

detecting, based on the first display window displayed in the first device, a second operation, wherein the second operation is used to indicate an operation of controlling the second device to cancel the occlusion on the area; and sending, based on the second operation, a cancellation instruction to the second device, wherein the cancellation instruction is used to instruct the second device to eliminate the occlusion on the area.

5. The method according to claim 4, wherein before said detecting, based on the first display window displayed in the first device, the first operation, the method further comprises:

sending a remote-control request to the second device;

receiving a remote-control response returned by the second device in response to the remote-control request, wherein a mirror image of the display interface of the second device is contained in the remote-control response; and displaying the mirror image in the first display window.

6. The method according to claim 1, wherein before said detecting, based on the first display window displayed in the first device, the first operation, the method further comprises:

sending a remote-control request to the second device;

receiving a remote-control response returned by the second device in response to the remote-control request, wherein a mirror image of the display interface of the second device is contained in the remote-control response; and displaying the mirror image in the first display window.

7. A system for remotely controlling interface display, the system comprising a first device and a second device, the first device establishing a remote-control connection with the second device and controlling the second device;

wherein the first device is configured to:

detect a first operation based on a first display window displayed in the first device, wherein the first display window displays a display interface of the second device, and the first operation is used to indicate an operation of controlling the second device to perform an occlusion on an area to be occluded in the display interface of the second device;

determine area information of the area based on the first operation; and send an occlusion instruction to the second device based on the area information, wherein the occlusion instruction carries the area information of the area to be occluded in the display interface of the second device; and wherein the second device is configured to perform an occlusion processing on the area according to the area information;

wherein, after the occlusion instruction is sent to the second device based on the area information, the first device is further configured to:

obtain text information sent by the second device, wherein the text information is used to describe a content of an occluded area in the display interface of the second device;

generate a floating window based on the text information; and display the floating window at a designated position of the first display window.

8. The system according to claim 7, wherein the first operation is a mouse drag operation;

wherein the first device is configured to determine the area information of the area based on the first operation determine comprises that the first device is configured to:

obtain mouse drag trajectory information corresponding to the mouse drag operation; and determine the mouse drag trajectory information to be the area information of the area.

9. The system according to claim 7, wherein, after the occlusion instruction is sent to the second device based on the area information, the first device is further configured to:

detect, based on the first display window displayed in the first device, a second operation, wherein the second operation is used to indicate an operation of controlling the second device to cancel the occlusion on the area; and send, based on the second operation, a cancellation instruction to the second device, wherein the cancellation instruction is used to instruct the second device to eliminate the occlusion on the area.

10. The system according to claim 7, wherein before the first operation is detected based on the first display window displayed in the first device, the first device is further configured to:

send a remote-control request to the second device;

receive a remote-control response returned by the second device in response to the remote-control request, wherein a mirror image of the display interface of the second device is contained in the remote-control response; and display the mirror image in the first display window.

11. The system according to claim 7, wherein, after the occlusion processing is performed on the area according to the area information, the second device is further configured to:

obtain the text information of the occluded area; and send the text information to the first device, wherein the text information is used by the first device to generate the floating window and to display the floating window at the designated position of the first display window.

12. The system according to claim 7, wherein after the occlusion processing is performed on the area according to the area information, the second device is further configured to:

eliminate, in response to a determination that a cancellation instruction sent by the first device is received, the occlusion on the area according to the cancellation instruction, wherein the cancellation instruction is an instruction sent by the first device to the second device after a second operation is detected by the first device based on the first display window displayed in the first device, and the second operation is used to indicate an operation of controlling the second device to cancel the occlusion on the area.

13. The system according to claim 7, wherein the first operation is a mouse drag operation, and the area information comprises mouse drag trajectory information corresponding to the mouse drag operation, and wherein the second device is configured to perform the occlusion processing on the area according to the area information comprises that the second device is configured to:

determine the area according to the mouse drag trajectory information; and generate a mask layer and displaying the mask layer over the area.

14. An electronic device, comprising: a memory, a processor, and a computer program stored in the memory and executable by the processor, wherein the processor, when executing the computer program, is configured to implement a method for remotely controlling interface display, wherein the method is applied to a first device that establishes a remote-control connection with a second device and controls the second device, and the method comprises:

detecting, based on a first display window displayed in the first device, a first operation, wherein a display interface of the second device is displayed in the first display window, and the first operation is used to indicate an operation of controlling the second device to perform an occlusion on an area to be occluded in the display interface of the second device;

determining, based on the first operation, area information of the area; and sending, based on the area information, an occlusion instruction to the second device, wherein the occlusion instruction is used to instruct the second device to perform an occlusion processing on the area based on the area information, wherein after said sending, based on the area information, the occlusion instruction to the second device, the method further comprises:

obtaining text information sent by the second device, wherein the text information is used to describe a content of an occluded area in the display interface of the second device;

generating a floating window based on the text information; and displaying the floating window at a designated position of the first display window.

15. The electronic device according to claim 14, wherein the first operation is a mouse drag operation;

said determining, based on the first operation, the area information of the area comprises:

obtaining mouse drag trajectory information corresponding to the mouse drag operation; and determining the mouse drag trajectory information to be the area information of the area.

16. The electronic device according to claim 14, wherein after said sending, based on the area information, the occlusion instruction to the second device, the method further comprises:

detecting, based on the first display window displayed in the first device, a second operation, wherein the second operation is used to indicate an operation of controlling the second device to cancel the occlusion on the area; and sending, based on the second operation, a cancellation instruction to the second device, wherein the cancellation instruction is used to instruct the second device to eliminate the occlusion on the area.

17. The electronic device according to claim 14, wherein before said detecting, based on the first display window displayed in the first device, the first operation, the method further comprises:

sending a remote-control request to the second device;

receiving a remote-control response returned by the second device in response to the remote-control request, wherein a mirror image of the display interface of the second device is contained in the remote-control response; and displaying the mirror image in the first display window.

18. A non-transitory computer-readable storage medium, the computer-readable storage medium storing a computer program, wherein the computer program, when executed by a processor, causes the processor to implement a method for remotely controlling interface display, wherein the method is applied to a first device that establishes a remote-control connection with a second device and controls the second device, and the method comprises:

detecting, based on a first display window displayed in the first device, a first operation, wherein a display interface of the second device is displayed in the first display window, and the first operation is used to indicate an operation of controlling the second device to perform an occlusion on an area to be occluded in the display interface of the second device;

determining, based on the first operation, area information of the area; and sending, based on the area information, an occlusion instruction to the second device, wherein the occlusion instruction is used to instruct the second device to perform an occlusion processing on the area based on the area information, wherein after said sending, based on the area information, the occlusion instruction to the second device, the method further comprises:

obtaining text information sent by the second device, wherein the text information is used to describe a content of an occluded area in the display interface of the second device;

generating a floating window based on the text information; and displaying the floating window at a designated position of the first display window.

* * * * *